United States Patent [19]

Inoue

[11] 4,294,121
[45] Oct. 13, 1981

[54] POSITION MEASURING SYSTEM

[75] Inventor: Kiyoshi Inoue, Tokyo, Japan

[73] Assignee: Inoue-Japax Research Incorporated, Yokohama, Japan

[21] Appl. No.: 38,174

[22] Filed: May 11, 1979

[30] Foreign Application Priority Data

| Jun. 6, 1978 | [JP] | Japan | 53-77591[U] |
| Aug. 5, 1978 | [JP] | Japan | 53-95976 |
| Aug. 5, 1978 | [JP] | Japan | 53-108225[U] |
| Dec. 22, 1978 | [JP] | Japan | 53-162352 |

[51] Int. Cl.³ .............................................. G01M 7/00
[52] U.S. Cl. ........................................................ 73/662
[58] Field of Search ................. 73/662, 573, 579, 668; 33/125 R; 310/338; 324/61 R

[56] References Cited

U.S. PATENT DOCUMENTS

| 3,400,331 | 9/1968 | Harris | 324/61 R |
| 3,955,404 | 5/1976 | Bickel et al. | 73/573 |

FOREIGN PATENT DOCUMENTS

| 1287334 | 1/1969 | Fed. Rep. of Germany . |
| 1473799 | 9/1969 | Fed. Rep. of Germany . |
| 1814984 | 12/1976 | Fed. Rep. of Germany . |
| 896491 | 5/1962 | United Kingdom . |
| 1013186 | 12/1965 | United Kingdom . |
| 1087475 | 10/1967 | United Kingdom . |
| 1250537 | 10/1971 | United Kingdom . |
| 2005022 | 4/1979 | United Kingdom . |
| 2006435 | 5/1979 | United Kingdom . |

*Primary Examiner*—Jerry W. Myracle
*Attorney, Agent, or Firm*—Karl F. Ross

[57] ABSTRACT

A position measuring head, especially for locating proximity to a surface of an object to be detected, is mounted on a support and can be displaced relative to this surface. A small vibration is imparted to the head and changes in the mode of vibration on contact or approach to the surface are detected to produce an output signal.

29 Claims, 7 Drawing Figures

POSITION MEASURING SYSTEM

FIELD OF THE INVENTION

The present invention relates to a position measuring system and, more particularly, an improvement in such a measuring system having a sensing head, stylus or feeler adapted to be brought into a contacting relationship with a surface, thereby measuring a position on the surface, a distance, a length or the size of a point thereon with respect to a reference point.

BACKGROUND OF THE INVENTION

A sensing head or feeler has been utilized in conventional measuring systems in which the sensing head or feeler is continuously displaced over a surface to be measured and its predetermined proximity to the surface is ascertained by sensing a physical contact or contact pressure between the relatively moving members. Difficulties have been encountered in sensing systems of this class in precisely determining establishment a given contact or proximity relationship especially where the members become sufficiently close that the rate of change in distance or contact pressure is minute and where the contact pressure cannot be precisely reliable.

OBJECT OF THE INVENTION

It is, therefore, the object of the present invention to provide an improved position sensing system which permits an increased sensing accuracy and reliability.

SUMMARY OF THE INVENTION

In accordance with the present invention, there is provided a position measuring system which comprises: a sensing head; means for supporting the sensing head and displacing it relative to a surface to be measured to detect a predetermined contact or proximity relationship therebetween; means for imparting a small vibration to the sensing head; and means responsive to a modification in the mode of vibration caused in the sensing head upon establishing the predetermined contact or proximity relationship with the surface for producing an output signal.

Specifically, the means for imparting the small vibration to the sensing head includes an electromechanical transducer which may be of the magnetostrictive or the electrostrictive type attached to the sensing head and adapted to provide a high-frequency vibration of a frequency in a range between 1 kHz and 50 kHz, preferably at least 10 kHz, and a power supply for energizing the transducer, the power supply and transducer being adapted to impart to the sensing head the high-frequency vibration with an amplitude of 0.1 to 10 $\mu$m, preferably not greater than 1 $\mu$m.

The system may include means responsive to change in proximity of the sensing head to the surface to be measured for manually or automatically modifying the amplitude of vibration imparted to the sensing head. This modifying means may include means for modifying the output frequency and/or output power of the high-frequency power supply to control the amplitude of vibration imparted to the sensing head. This modifying means may be adapted to respond to change in the resonant frequency of the sensing head in the presence of the surface for controlling the output frequency and/or power level of the high-frequency oscillator constituting the power supply.

The system may further include: drive means for advancing the support means which carries the sensing head; display means for indicating an amount of advancement of the sensing head; and means associated with the aforementioned responsive means for acting on the drive means with the output signal indicating the establishment of the predetermined contact relationship to terminate the advancement of the sensing head. Preferably, the drive means comprises a motor having an encoder for sensing the rotary displacement of the motor or a stepping motor.

The invention also provides a position measuring system for measuring the position of a movable member or drive shaft, comprising spindle means extending in parallel with the movable member and movable axially; a first electrode carried by the movable member or drive shaft; a second electrode carried by the spindle means so as to be juxtaposed with the first electrode; a power supply for applying a sensing voltage across said first and second electrodes; motor means for displacing the spindle means; means for sensing a voltage across said first and second electrodes to produce an control signal thereby controlling the motor means; and display means responsive to the rotation of the motor means for numerical display of the rotary displacement thereof.

SPECIFIC DESCRIPTION

Figure 1:
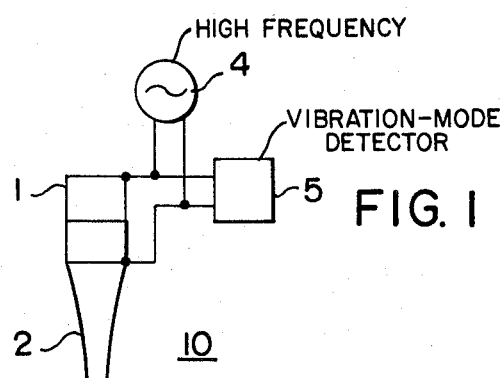
FIG. 1 is an elevational view, partly in a schematic form, illustrating a sensing head according the present invention.

Referring to FIG. 1, a sensing head or probe 10 in accordance with the present invention comprises a transducer 1, a horn 2 and a feeler or sensing tip 3. The transducer 1 which may be composed of quartz, AlFe, Ni-family materials, PbTiO$_3$-family materials, Pb(TiZr)O$_3$-family materials or any other element of magnetostrictive or piezoelectric or electrostrictive type is energized by a high-frequency power supply 4 to provide a high-frequency vibration in a sonic or preferably ultrasonic range, which is propagated via the horn 2 to the sensing tip 3 so that a small vibration is imparted to the latter with an amplitude of 0.1 to 1 $\mu$m and a frequency of 10 to 50 kHz although the vibration may also have a greater amplitude of 5 to 10 $\mu$m and a lower frequency of 2 to 3 kHz. In general, under no load conditions, the amplitude may be between 0.1 and 10 $\mu$m and the frequency between 1 and 50 kHz although a higher frequency in a megacycle range may sometimes be employed. Also connected with the transducer 1 is a detector 5 responsive to a change in the mode of vibration generated in the sensing tip 3.

When there is nothing in the direct proximity of the feeler 3, there will be no substantial change in the mode of vibration caused in the sensing tip 3 which will then be in vibration at an amplitude and frequency preset at the source 4. When the feeler 3 becomes proximal to or comes in a contacting relationship with a surface S or object to be detected, there results a change or modification in the mode of vibration as a function of closeness or the degree of contact between the vibrating tip 3 and the surface or object and this change can be sensed by the detector 5.

Because of the smallness of the amplitude of vibration imparted, the feeler 3 remains substantially at standstill and can be displaced and swept over the surface S with due precision in a usual manner for scanning purposes. The feeler 3 continues in vibration, reciprocating toward and away from the surface S with a small amplitude at a high-frequency and, when brought into a contacting relationship with the surface S, provides a sudden change in vibrational mode accompanying the establishment of such condition which can be detected with high precision and reliability by the detector 5.

Figure 2:
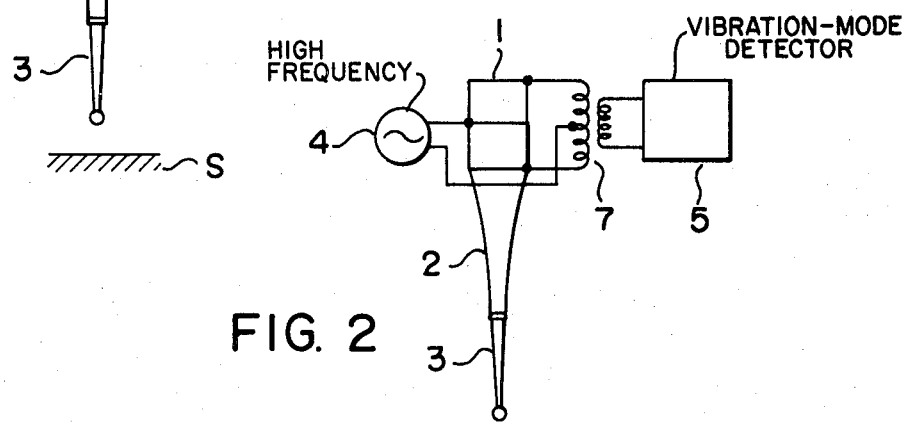
FIGS. 2 to 4 are schematic elevational views showing embodiments of the present invention.

FIG. 2 shows a modification of the vibrational sensing head 10 as described in which a transformer 7 constituting a voltage doubler is connected between the transducer 1 and the detector 5 to provide an intensified sensing signal for detection by the latter.

Figure 3:
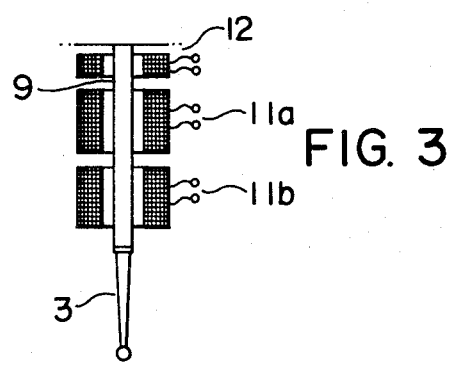

FIG. 3 shows a modification of the vibrational sensing head 10 as described in which the transducer comprises a rod-shaped magnetostrictive element 9 of AlFe or of the Ni family energizable by a pair of surrounding coils 11a divided axially of the vibratile rod 9 to apply a resulting magnetostrictive vibration to the sensing tip 3. Coaxially with the energizing coils 10 and 11, a sensing coil 12 is provided which is responsive to a change in inductance accompanying a change in magnetic moment $\mu$ of the transducer 1 which occurs when a change in vibrational mode is experienced by the latter.

Figure 4:
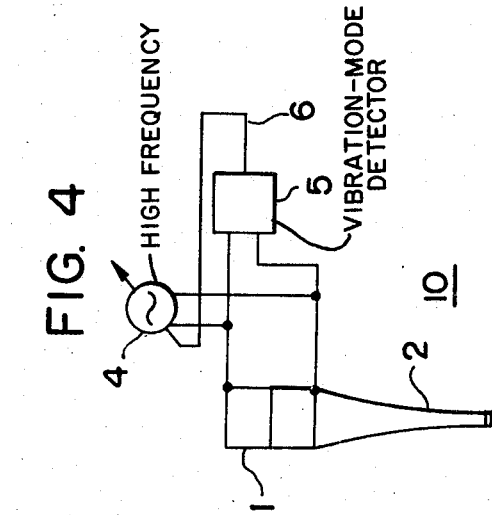

FIG. 4 shows a modified embodiment of the invention in which the detector circuit 5 has an output terminal 6 connected to the power supply 4 for controlling the output level thereof in accordance with the level of the sensed signal so that the amplitude of vibration imparted to the sensing tip or feeler 3 varies as a function of its distance from the confronting surface or object S to be detected.

Figure 5:
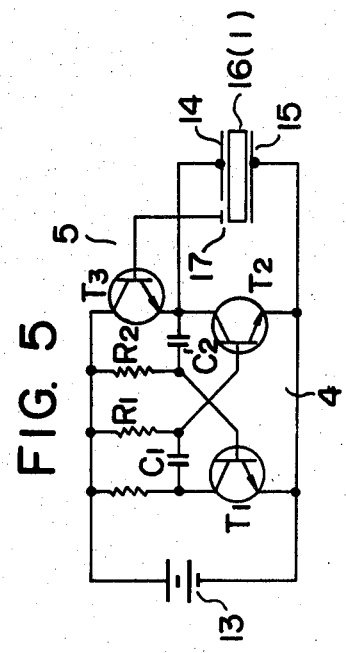
FIG. 5 is a circuit diagram of a control circuit for embodying a feature of the present invention.

Thus, as shown in FIG. 5, the power supply 5 may comprise a multivibrator oscillator arrangement including a pair of transistors T1 and T2 and associated time-constant elements C1, C2, R1 and R2 energized by a voltage source 13 and having output terminals led across the collector and emitter electrodes of the transistor T2 and connected across a pair of electrodes 14 and 15 of a quartz crystal 16 constituting the transducer 1. The latter has an additional electrode 17 connected to the base electrode of a transistor T3 inserted in series with the collector of the transistor T2. Here, the electrode 17 constitutes a sensing terminal for the transducer 16(1) and, together with transistor T3 and associated connections, constitutes the detector/control unit 5 as shown in FIG. 4.

The crystal oscillator 16 may be prepared by sintering a mixture of $0.992\{Pb(Mg_{\frac{1}{3}}Nb_{\frac{2}{3}})0.063TiO_{0.437}Zr_{0.5}O_3\}$ and $0.008CoO$ by placing the mixture in air at a temperature of 1200° C. under a pressure of 200 Kg/cm$^2$ for a period of 2 hours and heat-treating the sintered body at a temperature of 160° C. under an electric field of 2 kV/mm for a period of 0.5 hour. The resulting body, when energized at a voltage of 6 volts and a current of 0.36 mA oscillates at a frequency of 6.8 kHz. When approached and contacted by an object S, the oscillating body is observed to sharply reduce its resonant frequency.

The decrease in resonant frequency results in a reduction in the signal level at the sensing terminal 17 which causes the effective resistance between the collector and emitter voltage of the transistor T3 to be increased. The collector voltage of transistor T2 then drops, reducing the output power of the source 13 applied to the element 1. As is well known, a decrease in input power causes a reduction in amplitude of vibration of the transducer 1. The amplitude of vibration is thus reduced as the feeler 3 approaches the sensing surface S and the contact therebetween progresses.

In operating the sensing head 10, the input power to the transducer 1 can initially be set at an increased level to allow the feeler 3 to be vibrated with a greater amplitude. The feeler 3 then approaches the sensing object S to reduce the distance between them until the feeler tip 3 makes and breaks a slight contact with the sensing object S. The slightest contact can be ascertained in response to a drop in resonant frequency. The transistor T3 then increases its internal resistance to effectively reduce the output power level applied to the element 1. This results in a reduction in amplitude of vibration caused to the sensing tip 3 which will then be out of contact with the sensing surface. An advance of the sensing tip 3 resumes its slight vibratory contact with the surface with a reduced amplitude. In this manner, the feeler 3 may continuously or successively approach the sensing surface while reducing its vibrational amplitude and may be stopped when the amplitude or frequency reaches a preset level corresponding to a predetermined contacting relationship with the surface engaged thereby. For example, the amplitude of vibration may be initially set at 10 $\mu$m and may be gradually reduced to 1 $\mu$m as the tip 3 approaches the surface S or their contact progresses. This allows a measurement accuracy of $\pm 1$ $\mu$m.

The advance or feed adjustment of the sensing head may be effected either manually or automatically. The manual adjustment can be accomplished with a display which indicates measuring results while the automatic adjustment can be attained by provision of a control device fed by the detector 5 to act on a drive unit adapted to carry the sensing head 10.

The control of vibration amplitude can also be effected by modifying the input frequency, using the fact that the increase and decrease of the input frequency cause the decrease and increase of the amplitude. Thus, the input frequency can be varied from the range of 20 to 30 kHz to the range of 3 to 5 kHz as the distance between the contacting tip 3 and the contacted surface or object S is reduced.

It should be understood that the vibration of the sensing tip or feeler 3 is not limited to axial vibration and that a transverse vibration can likewise be employed.

Figure 6:
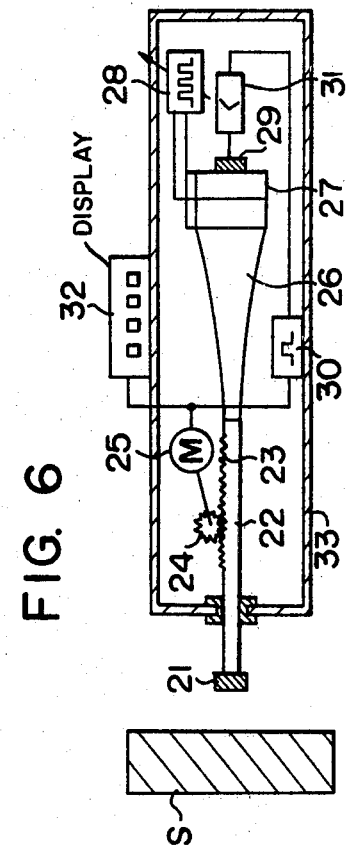
FIG. 6 is a longitudinal elevational view, partly in schematic form, showing a sensor embodying the present invention.

In an embodiment of FIG. 6, a sensing head 20 has a sensing tip or feeler 21 carried by a supporting rod 22 having a rack 23 which is in engagement with a pinion 24 driven by a motor 25. The motor 25 may be a DC motor but is preferably a stepping motor equipped with an encoder. The rod 25 is connected to a horn 26 having a transducer 27 of magnetostrictive or piezoelectric type attached thereto which is energized by a high-frequency power supply 28 of variable frequency and amplitude. Connected in contact with the transducer 27 is a vibration sensing element 29, e.g., a microphone, which applies a sensed vibration signal to a control unit 30 via a filter/amplifier 31. The control unit 30 constitutes a drive circuit for the motor 25 and normally produces drive pulses for the latter and, in response to a signal received from the amplifier 31, terminates the pulses to step the rotation of the motor 25. A counter display 32 registers the rotation of the motor 25 by counting drive pulse from the circuit 30 or pulses produced by the encoder in response to the motor rotation and thereby forms a display signal indicating the distance traveled by the rod 22 and the sensing tip or feeler 21. The elements 22 through 32 are shown received in a casing 33 with the sensing tip or feeler 21 carried by the rod 22 projecting therefrom for engagement with a surface or object S to be detected.

The transducer 27 provides a high-frequency vibration of 10 to 50 kHz with an amplitude adjusted at the output level of the power supply 28 in a range between 0.5 to 10 $\mu$m. The horn 26 propagates the high-frequency vibration to the sensing tip or feeler 21 carried by the rod 22. The control circuit 30 has a switch (not shown) turned on to initiate oscillation to produce drive pulses which are applied to the motor 25 to incrementally displace the rod 22 supporting the sensing tip 21. The displacement is counted in the counter circuit 32. The incremental displacement per given drive or encoded pulse is determined by the rack/pinion arrangement 23, 24 so that counting the pulse number provides a measurement of actual distance traveled by the feeler 21 which vibrates. The continued travel by the feeler 21 will cause its contact with the surface S. When the contact is reached, there results a change in the mode of vibration caused in the feeler 21 which is detected by the microphone 29. The latter responds to the signal which is greater in magnitude than when the tip and the surface S are out of contact and the signal is fed to the amplifier 31 which provides an output signal. The control circuit responds to the latter signal to act on the motor 25 to terminate the advance of the sensing tip 21.

The vibration imparted to the sensing tip or feeler 21 is of a frequency in the range between 10 and 50 kHz as described which is much higher than the frequency of drive pulses for the motor 25 which is typically less than 1 kHz. In other words, the sensing tip 21 performs 10 to 100 cycles of reciprocation while it is displaced by one increment given by a single drive pulse of the motor 25. When the tip 21 becomes so close to the surface S that the preset amplitude of vibration allows a slight contact with the surface, it will create slight making and breaking contacts 10 to 100 times to allow detection of a change in the mode of vibration which accompanies the contact before the sensing head 20 is advanced the next increment. Since this detection by the microphone 29 allows an instantaneous deactuation of the feed motor 25 with the control unit 30 to block the subsequent drive pulse, the counter/display 32 provides an extremely high precision measurement.

It will be seen that in general the smaller the amplitude of vibration, the higher the precision of measurement. As in the previous embodiment, the amplitude of vibration can desirably be set initially at a greater value for successive decrease as the distance between the sensing tip 21 and the surface S is narrowed to achieve an increased reliability and accuracy of measurement. Also, it has been mentioned that the pulse motor 25 for displacement of the sensing head 20 may be replaced by a DC motor, in which case the displacement can be sensed by means of a rotary encoder or linear magnetic scale arrangement which provides encoded pulses for counting by the counter in the display unit 32.

Figure 7:
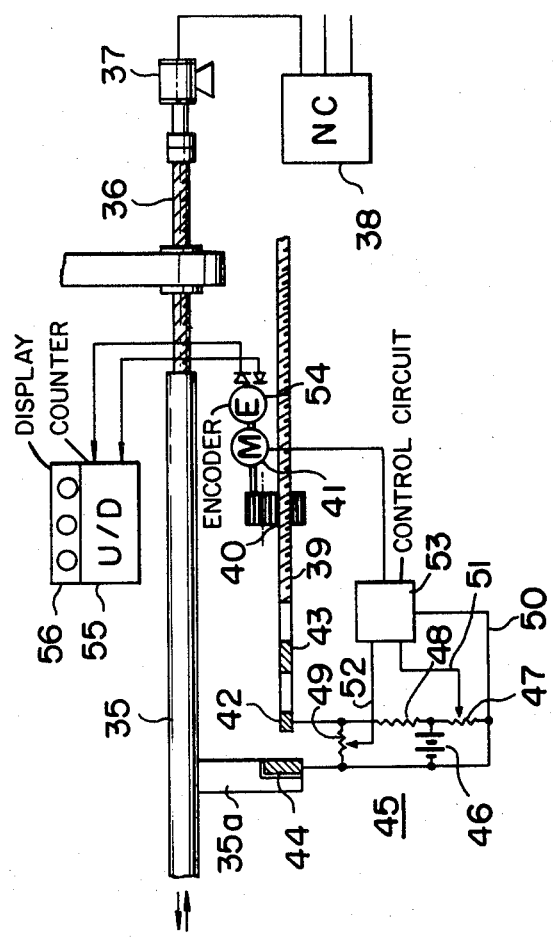
FIG. 7 is a diagrammatic longitudinal view, partly in a schematic form, illustrating a further embodiment of the present invention.

In FIG. 7 there is shown a novel position sensing system in accordance with the present invention, which may be used to indicate the position of sensing heads described previously. In this system, a movable member or drive shaft 35 which may be or may be connected with, a vibrating sensing head of previous embodiments is shown carried by a lead screw 36 driven by a motor 37 for displacement in the directions of arrows, the motor 37 being fed with drive signals by a numerical control (NC) unit 38 which governs displacement of the movable member or drive shaft 35.

Extending spacedly in parallel with the movable member 35 is an axially displaceable sensing spindle 39 carried by a lead screw 40 which is driven by a motor 41. The spindle 39 has an electrically conductive tip member 42 attached thereto via an elastic member 43 constituting a shock absorber. The movable member or drive shaft 35 has a projection 35a fixed thereto which is formed with an electrically conductive member 44 disposed in juxtaposition with the conductive member 42. Connected across the members 42 and 44, which form a pair of electrodes, is a sensing network 45 comprising a DC voltage source 46 and sensing resistors 47, 48 and 49 whose sensing terminals 50, 51 and 52 are led to a control circuit 53. Thus, the latter responds to the difference in magnitude between a gap voltage between the electrodes 42 and 44 provided by terminals 50 and 52 and a reference voltage provided by terminals 50 and 51, thereby acting on the motor 41. Accordingly, the motor 41 is servo-controlled in response to the gap signal representing a distance between the electrodes 42 and 44 so as to be stopped when the signal reaches a preset value defined by the reference voltage. An encoder 54 detects rotary displacement of the motor 41 to provide encoded pulses of both signs representing positive and negative rotary displacements of the motor 41, the pulses being fed to an up/down counter 55 for reversible accumulation or counting therein to provide a corresponding numerical display 56.

In operation, assume that the movable member or drive shaft 35 is displaced leftward resulting in an expansion or widening of the gap between the electrodes 42 and 44. The gap widening increases the differential voltage input across the terminals 52 and 51 to the control circuit 53 which acts on the motor 41 to advance or move leftward the spindle 39 so as to reduce the gap between the electrodes 42 and 44. When the drive shaft 35 ceases displacement after travel over a given distance, the electrode 42 on the sensing spindle 39 which continues the follow-up displacement reduces the distance with the electrode 44 on the drive shaft 35 until a contact or electrical discharge is created between them. When this occurs, the differential signal applied to the control circuit 53 becomes nil or a preset value and the motor 41 is thereby halted to cease displacement of the spindle 39. A rotary displacement of the motor 41 representing a linear displacement of the drive shaft 35 then accomplished appears on the numerical display 56 of the counter unit 55. Of course, by accelerating the rate of rotation of the motor 41, the rate of response of the follow-up spindle 39 can be accelerated so that it may move substantially as quickly as the drive shaft 35 is displaced.

Assume then that the drive shaft 35 is displaced rightward. With the electrodes 42 and 44 further approached, the balance in the sensing network 45 is lost so that the reference voltage becomes greater. The differential signal then reversed in sign in the control circuit 53 causes the motor 41 to be rotated in the reverse direction so as to withdraw or move the spindle backward until upon stoppage of the drive shaft 35 the voltage between the electrodes 42 and 44 becomes balanced with the reference voltage. The reverse rotary displacement of the motor 41 is converted by the encoder 54 into encoded pulses of negative sign which are applied to the counter 55 for substraction of the count level previously accumulated therein. The resulting count indication on the display 56 provides accurate measurement of the displacement and position of the drive shaft or movable member 35 displaced leftward or rightward.

The drive shaft 35 may be a spindle for carrying a tool electrode in electrical discharge machines which is repetitively moved back and forth. Then the motor 41 causes the spindle 39 to follow up forwardly or backwardly while permitting its forward or backward rotary displacement to be sensed by the encoder 54 with the corresponding pulse outputs for counting by the up/down counter 55 and numerical display by the indicator 56.

It is an important feature of this embodiment that a spindle 39 is arranged so as to perform a displacement following up the displacement of a drive shaft 35 in response to voltage change between electrodes 44 and 42 carried by the moving and moved member 39 and 34. This arrangement allows an extremely accurate follow-up and insures an excellent immenuity of the sensing system from external noises, thereby enabling a measurement and display at an increased stability and precision. Additionally, the structure is relatively simplified to allow devices to be manufactured at a reduced cost.

The motor 41 need not be limited to be of DC type as described but may alternatively be a pulse or stepping motor. A voltage-frequency converter may then be used to transform the control signal from the circuit 53 to digital pulses for counting by the up-down counter 55 to provide a numerical indication of the position measured at the display 56.

It is shown that the spindle 39 is capable of following up to the drive shaft 35 at a rate of response as high as 12 m/min and 6 m/min with a DC motor and a stepping motor, respectively.

There is thus provided an improved position measuring system which permits a desired measurement and reading at an increase precision and reliability and can be manufactured at a reduced cost.

What is claimed is:

1. A position measuring system comprising:
   (a) a sensing head;
   (b) support means for displacing said sensing head relative to a surface to be measured to detect a predetermined contact or proximity relationship thereof with said surface;
   (c) means for imparting a small vibration to said sensing head; and
   (d) means responsive to a modification in the mode of vibration caused in said sensing head upon establishing said predetermined contact or proximity relationship with said surface for producing an output signal, said means (c) for imparting vibration to said sensing head including an electromechanical transducer attached to said sensing head and energized by a power supply to impart to said sensing head a high frequency vibration of a frequency in a range between 1 kHz and 50 kHz and an amplitude in a range between 0.1 to 10 μm said means (d) responsive to a modification in the mode of vibration including means responsive to change in proximity of said sensing head to said surface for modifying the amplitude of vibration imparted to said sensing head.

2. The system defined in claim 1 wherein said modifying means is adapted to modify said vibration amplitude by changing the output frequency of said power supply.

3. The system defined in claim 1 wherein said modifying means is adapted to modify said amplitude by changing the output power level of said power supply.

4. The system defined in claim 1, claim 2 or claim 3 wherein said modifying means is adapted to respond to change in the resonant frequency of vibration caused in said sensing head.

5. The system defined in claim 1, further comprising feed means for advancing said sensing head toward said surface and including an electric motor and a drive circuit therefor, and display means for indicating a rotary displacement of said electric motor, said drive circuit being associated with said means (d) for receiving said output signal in response to establishment of said relationship between said sensing head and said surface to deactuate said electric motor thereby halting the advancement of said sensing head.

6. The system defined in claim 5 wherein said electric motor is a DC motor and has an encoder operatively connected therewith to convert a rotary displacement of said DC motor into a series of pulses.

7. The system defined in claim 5 wherein said electric motor is a stepping motor energized by a series of drive pulses.

8. The system defined in claim 6 or claim 7 wherein said display means includes counter means for accumulating said pulses and means for converting the accumulated pulses into a numerical display.

9. A measuring system for ascertaining a position of a movable member, the system comprising: spindle means movable axially in parallel with said movable member; a first electrode carried on said movable member; a second electrode carried on said spindle means, said first and second electrodes being arranged to be juxtaposed with one another to form a gap spacing therebetween; a power supply for applying an electric potential across said gap spacing; motor means for displacing said spindle means; means for sensing a voltage across said gap spacing to produce a control signal representing a distance therein, thereby controlling said motor means; and display means responsive to the rotation of said motor means to produce a numerical display representing a rotary displacement thereof.

10. The system defined in claim 9 wherein said movable member is a sensing head, said system further comprising means for imparting a high frequency vibration of a frequency in a range between 1 kHz and 50 kHz and an amplitude in the range of 0.1 to 10 microns to said sensing head, and means responsive to a modification of the mode of vibration caused in said sensing head for producing an output signal.

11. A position measuring system comprising:
   (a) a sensing head;
   (b) support means for displacing said sensing head relative to a surface to be measured to detect a predetermined contact or proximity relationship thereof with said surface;

(c) means for imparting a small vibration to said sensing heat;

(d) means responsive to a modification in the mode of vibration caused in said sensing head upon establishing said predetermined contact or proximity relationship with said surface for producing an output signal; and (e) feed means for advancing said sensing head toward said surface and including an electric motor and a drive circuit therefor, and display means for indicating a rotary displacement of said electric motor, said drive circuit being associated with said means (d) for receiving said output signal in response to establishment of said relationship between said sensing head and said surface to deactuate said electric motor thereby halting the advancement of said sensing head.

12. A position measuring system comprising:
(a) a sensing head;
(b) support means for displacing said sensing head relative to a surface to be measured to detect a predetermined contact or proximity relationship thereof with said surface;
(c) means for imparting a small vibration to said sensing head;
(d) means responsive to a modification in the mode of vibration caused in said sensing head upon establishing said predetermined contact or proximity relationship with said surface for producing an open output signal, said means (c) including an electromechanical transducer attached to said sensing head and energized by a power supply to impart to said sensing head a high frequency vibration of a frequency in a range between 1 kHz and 50 kHz and an amplitude in a range between 0.1 to 10 μm; and
(e) feed means for advancing said sensing head toward said surface and including an electric motor and a drive circuit therefor, and display means for indicating a rotary displacement of said electric motor, said drive circuit being associated with said means (d) for receiving said output signal in response to establishment of said relationship between said sensing head and said surface to deactuate said electric motor thereby halting the advancement of said sensing head.

13. The system defined in claim 11 or claim 12 wherein said electric motor is a DC motor and has an encoder operatively connected therewith to convert a rotary displacement of said DC motor into a series of pulses.

14. The system defined in claim 11 or claim 12 wherein said electric motor is a stepping motor energized by a series of drive pulses.

15. The system defined in claim 11 or claim 12 wherein said display means includes counter means for accumulating said pulses and means for converting the accumulated pulses into a numerical display.

16. A device for detecting a contact of a solid surface with a contact sensing probe on an elongated stylus assembly having a stylus in a position measuring system, said device comprising:
support means for carrying said stylus assembly to advance said probe towards said solid surface;
vibration means for imparting a small vibration to said stylus in the axial direction thereof to reciprocate repetitively said probe toward and away from said solid surface with an amplitude of 0.1 and 10 μm; and
response means responsive to a modification in the mode of vibration of said stylus upon said probe establishing a predetermined contact or proximity relationship with said solid surface for producing an output signal, said vibration means including an electromechanical transducer attached to said stylus and energized by a power supply to impart to said stylus a high frequency vibration of a frequency in a range between 1 kHz and 50 kHz and an amplitude in a range between 0.1 to 10 μm.

17. The device defined in claim 16 wherein said contact sensing probe is a spherical element.

18. The device defined in claim 16 wherein said response means includes means responsive to change in proximity of said probe to said solid surface for modifying the amplitude of reciprocation imparted to said probe.

19. The device defined in claim 18 wherein said modifying means is adapted to modify said reciprocation amplitude by changing the output frequency of said power supply.

20. The device defined in claim 18 wherein said modifying means is adapted to modify said reciprocation amplitude by changing the output power level of said power supply.

21. The device defined in claim 18 wherein said modifying means is adapted to respond to change in the resonant frequency of vibration caused in said stylus.

22. A device for detecting a contact of a solid surface with a contact sensing probe on an elongated stylus assembly having a stylus in a position measuring system, said device comprising:
support means for carrying said stylus assembly to advance said probe towards said solid surface;
vibration means for imparting a small vibration to said stylus in the axial direction thereof to reciprocate repetitively said probe toward and away from said solid surface with an amplitude of 0.1 and 10 μm;
response means responsive to a modification in the mode of vibration of said stylus upon said probe establishing a predetermined contact or proximity relationship with said solid surface for producing an output signal;
feed means for advancing said stylus assembly toward said surface and including an electric motor and a drive circuit therefore; and
display means for indicating a rotary displacement of said electric motor, said drive circuit being associated with said response means for monitoring said relationship between said sensing probe and said solid surface to deactuate said electric motor thereby halting the advancement of said stylus assembly.

23. The device defined in claim 22 wherein said electric motor is a DC motor and has an encoder operatively connected therewith to convert a rotary displacement of said DC motor into a series of pulses.

24. The device defined in claim 22 wherein said electric motor is a stepping motor energized by a series of drive pulses.

25. The device defined in claim 22 wherein said display means inclues counter means for accumulating said pulses and means for converting the accumulated pulses into a numerical display.

26. A device for detecting a contact of a solid surface with a contact sensing probe on an elongated stylus assembly having a stylus in a position measuring system, said device comprising:

supportmeans for carrying said stylus assembly to advance said probe towards said solid surface;

vibration means for imparting a small vibration to said stylus in the axial direction thereof to reciprocate repetitively said probe toward and away from said solid surface with an amplitude of 0.1 and 10 µm; and response means responsive to a modification in the mode of vibration of said stylus upon said probe establishing a predetermined contact or proximity relationship with said solid surface for producing an output signal, said support means being adapted to carry said stylus assembly to displace said sensing probe over said surface in a scanning operation.

27. The device defined in claim 26 wherein said contact sensing probe is a spherical element.

28. A device for detecting a contact of a solid surface with a contact sensing probe on an elongated stylus assembly having a stylus in a position measuring system, said device comprising:

support means for carrying said stylus assembly to advance said probe towards said solid surface;

vibration means for imparting a small vibration to said stylus in the axial direction thereof to reciprocate repetitively said probe toward and away from said solid surface with an amplitude of 0.1 and 10 micrometers; and response means responsive to a modification in the mode of vibration of said stylus upon said probe establishing a predetermined contact or proximity relationship with said solid surface for producing an output signal.

29. The device defined in claim 28 wherein said contact sensing probe is a spherical element.

* * * * *